Dec. 18, 1962

W. G. McKENZIE 3,068,959

LUBRICATION SYSTEM

Filed Sept. 3, 1959

INVENTOR.
William G. McKenzie.
BY
Harness, Dickey & Pierce
ATTORNEYS.

United States Patent Office 3,068,959
Patented Dec. 18, 1962

3,068,959
LUBRICATION SYSTEM
William G. McKenzie, Racine, Wis., assignor to Walker Manufacturing Company, Racine, Wis., a corporation of Delaware
Filed Sept. 3, 1959, Ser. No. 837,805
14 Claims. (Cl. 184—7)

This invention relates to fluid delivery systems, and more particularly to systems adapted for use in industrial or automotive applications, and which provide for the periodic delivery of metered amounts of lubricant to a plurality of bearings.

It is an object of the invention to provide a novel and improved fluid delivery system which may be relied upon to deliver automatically a metered amount of lubricant or other fluid at regular intervals to a number of delivery points, and which can be easily adapted to deliver different quantities of lubricant to different points.

It is another object to provide an improved lubricating system of this nature which permits variation in frequency of delivery of each charge of lubricant as well as the amount of each charge, and in which such variations may be accomplished in a simple manner.

It is a further object to provide an improved industrial lubricating system having the above characteristics, which is economical to manufacture and easy to maintain, is reliable in operation, and whose function can be ascertained by observation.

Other objects, features, and advantages of the present invention will become apparent from the subsequent description, taken in conjunction with the accompanying drawings.

Figure 1:
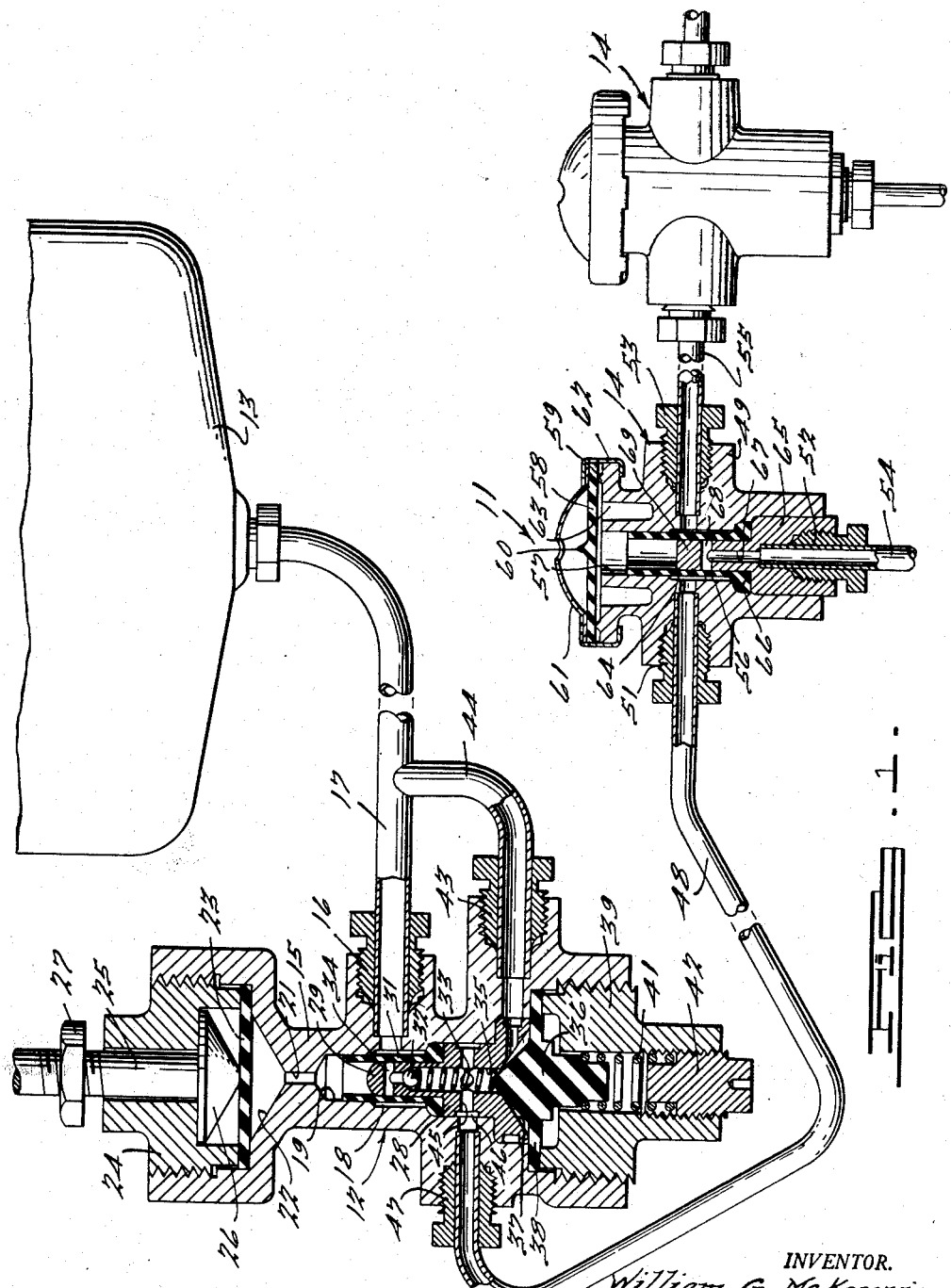
FIGURE 1 is a partially schematic side elevational view, partly in cross-section and showing the construction of the pump, relief valve and a metering device.

In general terms the illustrated embodiment of the invention comprises a centrally located pump which is connected to a reservoir of lubricant or other fluid and is adapted to deliver this lubricant at a predetermined rate to a plurality of metering devices, the outlets of which are connected to bearings in an industrial establishment, an automobile or any other desired location. The pump includes means for alternately building up lubricant pressure as well as a charge of lubricant in each metering device, and then relieving the pressure in the connection between the metering device and pump, the metering device being so constructed that it will then automatically release a charge of lubricant toward its corresponding bearing. Both the pump assembly and the metering device include novel valve constructions which make use of resilient elements. A relief check valve is provided in the pump assembly which can be set to open when a predetermined pressure is attained in the system, this valve means so constructed that it will be held open until the pressure is fully relieved, thus permitting the metering devices to be discharged. The frequency of discharge, as well as the quantity released during each discharge may be controlled by setting of the relief valve counter-pressure. The total quantity of lubricant delivered over a longer period is controllable by variation of the length and frequency of the pump stroke.

Referring more particularly to the drawings, the system is generally indicated at 11 and comprises a pump assembly generally indicated at 12, a reservoir 13 to which the pump assembly is connected, and a plurality of metering devices generally indicated at 14 which are adapted to receive lubricant delivered from pump 12 and to discharge this lubricant periodically to bearings or other types of delivery points (not shown).

Pump assembly 12 comprises a body 15 having an intake port 16 in one side thereof, this port being connected by a conduit 17 to reservoir 13. Port 16 leads to an annular chamber 18 within body 15, and a passageway 19 of somewhat smaller diameter than chamber 18 extends upwardly therefrom. This passageway leads through an intermediate passageway 21 to a pump chamber 22 of conical shape, the upper end of this pump chamber being closed by a diaphragm 23. The outer edge of this diaphragm is secured in position by a plug 24 threaded in the top of housing 15. A pump plunger 25 is slidably mounted in member 24 and carries a conical member 26 at the lower end thereof engageable with diaphragm 23. A nut 27 is threadably mounted on plunger 25 and may be adjusted so as to vary the stroke of the plunger, which is reciprocable by any appropriate means. It will be noted that when plunger 25 moves downwardly, its conical end 26 will force diaphragm 23 down into chamber 22, thus forcing lubricant out of this chamber. When the force on plunger 25 is removed, diaphragm 23 will lift the plunger into the position shown in FIGURE 1.

An intermediate member 28 is secured within valve body 15, this member having an upper portion 29 which extends upwardly into chamber 18. A tubular sleeve 31 of resilient material surrounds extension 29, the sleeve having an outwardly extending shoulder at its lower end by means of which it is secured in position between member 28 and housing 15. The length of sleeve 31 is such that it fits snugly within bore 19 when in its unrestrained condition and also snugly engages extension 29.

A ball check valve 32 is disposed within a central bore in member 28 and is urged upwardly against its seat by a spring 33. Transverse and axial passages indicated at 34 connect the outer surface of extension 29 with the seat of valve 32. Spring 33 is disposed within an axial bore 35 which is open at the lower end of member 28, forming a seat for a relief valve 36. This valve is of conical shape and may be constructed of resilient material, the apex of the valve forming a support for the lower end of spring 33.

Relief valve 36 is disposed within the flared lower end 37 of member 28, the shape of the relief valve being somewhat narrower than the flared portion 37 so that in its closed position the relief valve will only engage the lower end of bore 35. A flange 38 is provided on the relief valve, this flange being secured within the housing by a plug 39 threaded into the housing. The relief valve is urged upwardly by a spring 41 within plug 39, the lower end of this spring being supported by an adjustable screw 42 so that the spring pressure may be varied. It should be observed that when relief valve 36 moves downwardly from its closed position as seen in FIGURE 1, lubricant forced downwardly through bore 35 will engage a relatively large area of the check valve, so that the total force on the check valve will be greatly increased to hold it in its open position. A port 43 leads from lower portion 37 of member 28 to a conduit 44 which is connected to conduit 17, thus forming a return passage for the lubricant when the relief valve is open.

The intermediate portion of member 28 has a plurality of radial passages 45 leading to an annular chamber 46, this chamber in turn being connected with an outlet port 47 in body 15. A conduit 48 leads from outlet port 47 to a series of metering devices 14. It will be understood that the connections between metering devices 14 and pump 12 could be other than the series arrangement shown within the principles of the invention.

Each metering device 14 comprises a body 49 having an inlet port 51, a working or delivery port 52 and an outlet port 53. Working port 52 is adapted to be connected by a conduit 54 to a bearing (not shown) or other station which is to receive the fluid metered from device 14. Outlet port 53 is adapted to be connected by a conduit 55 to the inlet port of the next metering device 14 in the series.

Figure 4:
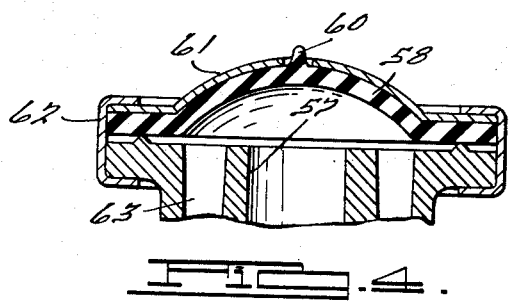
FIGURE 4 is a fragmentary side elevational view in cross-section of the upper portion of a metering device showing the diaphragm in its dilated position.

Ports 51 and 53 are aligned and connect with a central chamber 56 on opposite sides thereof. A bore 57 of somewhat narrower diameter than chamber 56 extends upwardly therefrom and is open at the upper end of body 49. A diaphragm 58 is secured to the top of body 49, the body being provided with a generally flat top having an annular ridge 59. Diaphragm 58 has an upwardly projecting portion 60 which may pass through a centrally apertured dome-like shell or cover 61 which encloses the diaphragm. In the illustrated embodiment, a circular clamping member 62 is provided for securing diaphragm 58 and cover 61 to body 49, so that the outer portion of diaphragm 58 is forced against ridge 59. An annular recess is provided in the top of body 49, so that a storage cavity or chamber 63 is formed by diaphragm 58 which includes this recess, bore 57 and the space between the diaphragm and body 49. It will be observed that diaphragm 58 may be extended or dilated upwardly as shown in FIGURE 4 to increase the size of this chamber, but that the pressure in the chamber will increase as diaphragm 58 is stretched. Cover 61 will limit outward movement of the diaphragm, so that a given quantity of fluid will be accumulated in each charge even though the inlet pressure is increased. The quantity of fluid delivered by each metering device 14 may thus be varied by changing the size of cover 61, or by choosing a different diameter for diaphragm 58 and the adjacent portion of the metering device body. Projection 60 will serve as a visual indication of the functioning of metering device 14 during operation.

It should be pointed out that other types of pressure-storing means could be substituted for the diaphragm arrangement shown in the illustrated embodiment.

An elongated tubular sleeve 64 of rubber or other resilient material is disposed within chamber 56 and extends upwardly into passageway 57. Sleeve 64 has an outside diameter which in its unrestrained condition fits snugly within bore 57 and is spaced inwardly from the surface of chamber 56 so as to form an annular chamber therewith. An insert 65 is provided in the lower end of body 49, this insert engaging a shoulder 66 at the lower end of sleeve 64 to retain the sleeve in position. Insert 65 has an axial passage 67 connected with port 52, and a radial passage 68 at the upper end of passage 67 and connected with the outer surface of an upward extension 69 on insert 65 within tube 64. The length of extension 69 is such that it does not reach the upper end of chamber 56 so that sleeve 64, which fits snugly on extension 69 when in its undistorted condition, will be capable of expanding away from extension 69 when the pressure within sleeve 64 is greater than the pressure in chamber 56.

Figure 2:
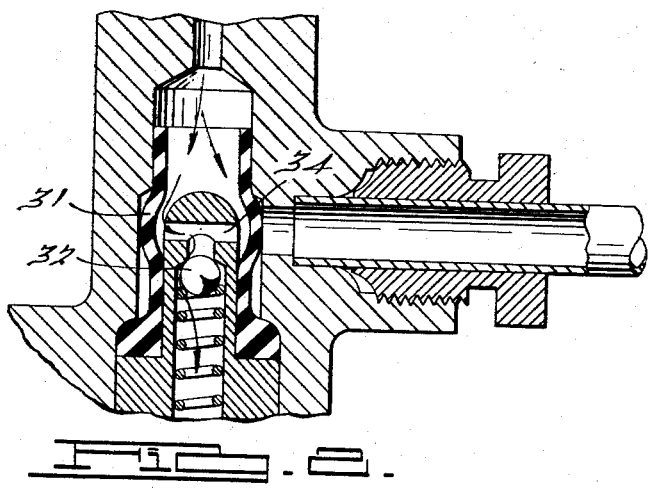
FIGURE 2 is a fragmentary cross-sectional view in elevation of the pump valve arrangement shown during a pumping stroke.

In operation of the novel fluid delivery system, assuming an initial condition in which the system is filled with oil, light grease or other fluid and the parts are in the position shown in FIGURE 1, downward movement of pump plunger 25 will force fluid from chamber 22 and through passageway 21, bore 19 and the inside of sleeve 31. This will cause sleeve 31 to expand at its midsection, as shown in FIGURE 2, and the fluid will flow into passageway 34, past ball check valve 32 and through bore 35 into passages 45 and annular chamber 46. Relief valve 36 will be held in its closed position by spring 41, the initial pressure in the system being less than that necessary to open valve 36. Fluid will be forced through port 47 and conduit 48 into inlet port 51 of the first metering device 14.

The pressure in chamber 56 of the metering device will cause sleeve 64 to contract against extension 69 of insert 65. The upper portion of sleeve 64 will however be deflected inwardly to permit fluid to flow upwardly into bore 57 so that it will collect in chamber 63. Diaphragm 58 will begin to dilate as shown in FIGURE 4 and the pressure within chamber 63 will begin to increase. Since sleeve 64 is pressed against passage 68 no fluid will be permitted to flow into delivery port 52. However, fluid will pass around sleeve 64 and into outlet port 53 from where it will be delivered to subsequent metering devices 14 in the series.

Figure 3:
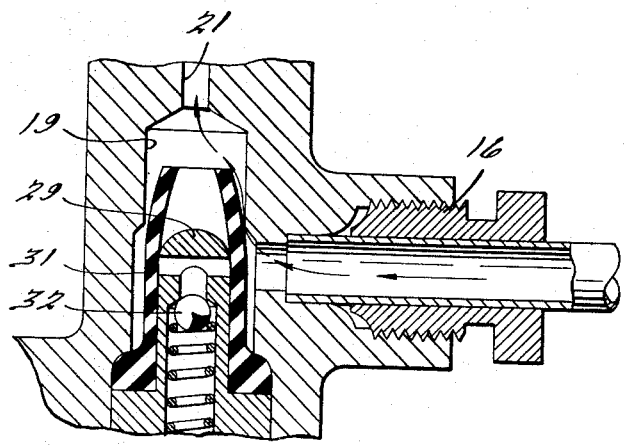
FIGURE 3 is a view similar to FIGURE 2 showing the position of the parts during an intake stroke.

After plunger 25 has moved downwardly until nut 27 engages member 24, the plunger will be moved upwardly with diaphragm 23 contracting to create a partial vacuum in chamber 22. This will cause sleeve 31 to contract around extension 29, and additional fluid will flow into port 16 and past the contracted upper end of sleeve 31 into chamber 19, passage 21 and chamber 22, as seen in FIGURE 3. Check valve 32 will prevent any back flow of fluid from metering devices 14 during the upstroke of plunger 25. The pressure will thus be maintained in these metering devices. Repeated downstrokes of plunger 25 will force additional fluid into metering devices 14, causing further dilation of diaphragms 58 and building up the charge of fluid and pressure in each metering device collection chamber 63.

This action will continue until the pressure in bore 35 is raised sufficiently to counteract the force of spring 41 and force fluid into chamber 37. This fluid will act upon the full area of relief valve 36 and cause this relief valve to move to its fully opened position. The pressure in bore 35, line 48, and chambers 63 of metering devices 14 will thus be quickly relieved, the excess fluid in line 48 and bore 35 being returned to reservoir 13 through conduit 44.

As the pressure in chamber 56 of each metering device 14 is momentarily reduced from that in chamber 63, the upper portion of sleeve 64 will expand until it engages the wall of bore 57. The pressure in bore 57 caused by dilated diaphragm 58 will then cause expansion of the midportion of sleeve 64 into chamber 56, exposing the opposite ends of passageway 68 to the fluid within the sleeve. Diaphragm 58 will thus be permitted to contract and force a charge of fluid from bore 57 through sleeve 64, passageways 68 and 67 and port 62 to conduit 54.

After the pressure in chamber 63 has been relieved sufficiently, sleeve 64 will return to its normal position as shown in FIGURE 1 in readiness for the accumulation of another charge of fluid in metering device 14. Relief valve 36 will also be returned to its closed position as soon as the pressure in chamber 37 is reduced sufficiently to permit spring 41 to close the valve. Pump plunger 25 will continue to reciprocate and will thus feed the next charge of fluid to each metering device 14.

It should be observed that sleeve 64 of each metering device, in conjunction with its adjacent parts, acts as an automatically controllable three-way valve which will be operated in accordance with pressure differential acting upon it. During the pumping portion of each cycle, the pressure in each inlet chamber 56 will be equal to or greater than the pressure in storage chamber 63, so that passage 68 will be closed by the surrounding sleeve 64. When the pressure in chamber 56 is reduced by opening of relief valve 36, the connection between chamber 56 and bore 57 will be closed by the tendency of the upper portion of tube 64 to expand, while dilation of the intermediate portion of the sleeve will expose the ends of passage 68, permitting discharge of the fluid toward the bearing.

The total amount of lubricant or other fluid delivered to the metering devices over a period of time will be determined by the frequency of reciprocation of plunger 25 as well as the length of its stroke. In order to preselect the frequency with which metering device 14 discharges, and the amount of such charge, spring 41 may be adjusted by means of plug 42. For example, if it is desired that the amount of each fluid charge built up in a metering device 14 be relatively small, spring 41 may be relaxed, so that relief valve 36 will open when a relatively low pressure has been attained. At a given pump delivery rate, this will mean a relatively greater frequency of discharge, the total amount of fluid delivered by each metering device over a priod of time being constant. Likewise, increasing the force of spring 41 will result in a greater charge being built up in each metering device before relief valve 36 opens, but the frequency of opening and therefore of metering device discharge will be lower.

It should also be observed that the novel metering device 14 will automatically build up a greater pressure should a partial obstruction occur, for example, at a bearing serviced by its delivery port 52, thus tending to clear such obstruction and maintain free and unobstructed fluid flow. Each metering device 14 will operate independently of the others in this respect and will not interfere with normal functioning of the entire system.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a fluid delivery system, a pump, a metering device, a connection between the outlet port of said pump and the inlet port of said metering device, storage means in said metering device for collecting a charge of fluid under pressure, means for relieving the pressure in said connection in response to the attainment of a predetermined pressure level, a delivery port in said metering device, and a valve between said storage means and said delivery port responsive to buildup of pressure in said connection to prevent fluid discharge from said storage means to said delivery port and responsive to said pressure relief in said connection for discharging the fluid in said storage means to said delivery port.

2. The combination according to claim 1, said pressure relieving means comprising a relief valve, resilient means urging said relief valve to a closed position, and means responsive to partial opening of said relief valve for increasing the force on said valve counteracting said resilient means.

3. In a fluid delivery system, a reciprocable variable stroke pump, inlet and outlet ports for said pump having a connection therebetween, a relief valve for said connection, means for adjusting the opening pressure of said relief valve, a metering device, a connection between the outlet port of said pump and the inlet port of said metering device, a delivery port leading from said metering device, a charge retaining chamber in said metering device, resilient means for storing pressure in response to the addition of fluid to said charge retaining chamber, and means in said metering device responsive to pressure buildup at the inlet port of said metering device to prevent fluid discharge from said charge retaining chamber to said delivery port and responsive to opening of said relief valve for discharging fluid stored in said charge retaining chamber to said delivery port.

4. The combination according to claim 3, said relief valve comprising a conical section, a valve seat engageable by the outer portion of said conical section, and a diaphragm portion extending outwardly from the base of said conical section.

5. In a metering device for use in conjunction with a fluid distributing system, a body, storage means in said body for collecting a charge of fluid under pressure, an inlet port and a delivery port in said body, a resilient sleeve fixed against axial movement in said body, and means adjacent said sleeve and forming in conjunction therewith a first valve between said inlet port and said storage means and a second valve between said storage means and said delivery port.

6. In a metering device for use in conjunction with a fluid metering system, a body having an inlet chamber, an inlet port leading into said body from one side of said inlet chamber, a delivery port in said body, storage means in said body for collecting a charge of fluid under pressure, a bore leading from one end of said inlet chamber to said storage means, an elongated sleeve of resilient material having an intermediate portion disposed within said inlet chamber and an end portion disposed within said bore, and a member disposed within said sleeve and having a passageway leading to said delivery port, the relative dimensions of said storage means, bore and member being such that a pressure differential in said inlet chamber over said bore will cause said end portion of the sleeve to deflect and permit passage of fluid from the inlet chamber to the storage means, and a pressure differential of said bore over said inlet chamber will cause deflection of said intermediate sleeve portion to permit fluid flow from said storage means to said delivery port.

7. The combination according to claim 6, said storage means including a diaphragm secured to one side of said body and adapted to be dilated by influx of fluid to said storage means.

8. The combination according to claim 7, further provided with a cover for limiting the dilating movement of said diaphragm.

9. The combination according to claim 8, said diaphragm being further provided with a projection, and an apertured portion in said cover for receiving said projection, whereby said projection may be observed during operation of the metering device.

10. The combination according to claim 6, further provided with an outlet port in said body connected to said inlet chamber and adapted to pass fluid through said metering device without entering said storage means.

11. In a metering device, an inlet port, a delivery port, storage means for collecting a charge of fluid under pressure, and a resilient member having a first resilient portion forming a first check valve between said inlet port and said storage means and a second resilient portion forming a second check valve between said storage means and said delivery port, said resilient portions being deformable independently of each other when moving between their opened and closed positions whereby fluid may flow only in one direction from said inlet port to said storage means and only in one direction from said storage means to said delivery port.

12. In a fluid delivery system, a reservoir, a pump having inlet and outlet ports, a connection between said reservoir and the inlet port of said pump, a metering device, a connection between the outlet port of said pump and the inlet of said metering device, means in said metering device responsive to an increase in pressure at its inlet to store fluid and responsive only to a decrease in pressure at its inlet to discharge fluid, a return line leading from said pump outlet port to said reservoir, and a relief valve in said return line movable between a closed position and an open position, said relief valve comprising a member of resilient material having a conical section, a valve seat engageable by said conical section, a diaphragm section connected to the base of said conical section, and a chamber connected to said diaphragm and adapted to be pressurized when said relief valve is partially opened to move the relief valve to a fully open position.

13. In a fluid delivery system, a pump, a metering device, a connection between the outlet of said pump and the inlet port of said metering device, storage means in said metering device for collecting a charge of fluid under pressure, means for relieving the pressure in said connection in response to the attainment of a predetermined pressure level, a delivery port in said metering device, and means responsive to said pressure relief in said connection for discharging the fluid in said storage means to said delivery port, said last-mentioned means comprising a resilient sleeve in said metering device having one portion forming a valve between said inlet port and said storage means and another portion forming a valve between said storage means and said delivery port, said sleeve being responsive to a pressure differential in said inlet port over said storage means for opening said first valve and closing said second valve, said sleeve being further responsive to a pressure differential in said storage means over said inlet port for closing said first valve and opening said second valve.

14. In a fluid delivery system, a reservoir, a pump having inlet and outlet ports, a connection between said reservoir and the inlet port of said pump, a metering device, a connection between the outlet port of said pump and the inlet of said metering device, means in said metering device responsive to an increase in pressure at its inlet to store fluid and responsive only to a decrease in pressure at its inlet to discharge fluid, a return line leading from said pump outlet port to said reservoir, a relief valve in said return line movable between a closed position and an open position, said relief valve comprising a member of resilient material having a conical section, a valve seat engageable by said conical section, a diaphragm section connected to the base of said conical section, a chamber connected to said diaphragm and adapted to be pressurized when said relief valve is partially opened to move the relief valve to its fully opened position, a check valve between pump inlet and outlet ports, and a spring engageable with said valve and having one end supported by the apex of said relief valve conical section.

References Cited in the file of this patent
UNITED STATES PATENTS

| | | |
|---|---|---|
| 1,942,096 | Hallerberg | Jan. 2, 1934 |
| 2,141,022 | Rotter | Dec. 20, 1938 |
| 2,219,681 | Davis | Oct. 29, 1940 |
| 2,742,978 | Peterson et al. | Apr. 24, 1956 |
| 2,797,703 | Edwards | July 2, 1957 |
| 2,817,462 | Lipinski | Dec. 24, 1957 |
| 2,888,946 | Barron | June 2, 1959 |